Aug. 4, 1925.

Z. H. WILLIAMS

BENCH CLAMP DEVICE

Filed Sept. 22, 1923

1,548,295

Inventor,
Z. H. Williams

Patented Aug. 4, 1925.

1,548,295

UNITED STATES PATENT OFFICE.

ZENAS H. WILLIAMS, OF SAN ANTONIO, TEXAS.

BENCH CLAMP DEVICE.

Application filed September 22, 1923. Serial No. 664,256.

*To all whom it may concern:*

Be it known that I, ZENAS H. WILLIAMS, a citizen of the United States, residing at San Antonio, in the county of Bexar and State of Texas, have invented a new and useful Bench Clamp Device, of which the following is a specification.

This invention aims to provide novel means whereby a piece of work may be clamped on a bench whilst the work is being planed or operated on otherwise, the device being adjustable for work of different sizes and being so constructed that it may serve as a bench stop, it being possible to remove the jaws from the bench, and leave the upper surface of the bench unencumbered when there is no occasion for using the device forming the subject matter of this application.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed it being understood that within the scope of what is claimed changes in the precise embodiment of the invention shown can be made without departing from the spirit of the invention.

Figure 1:
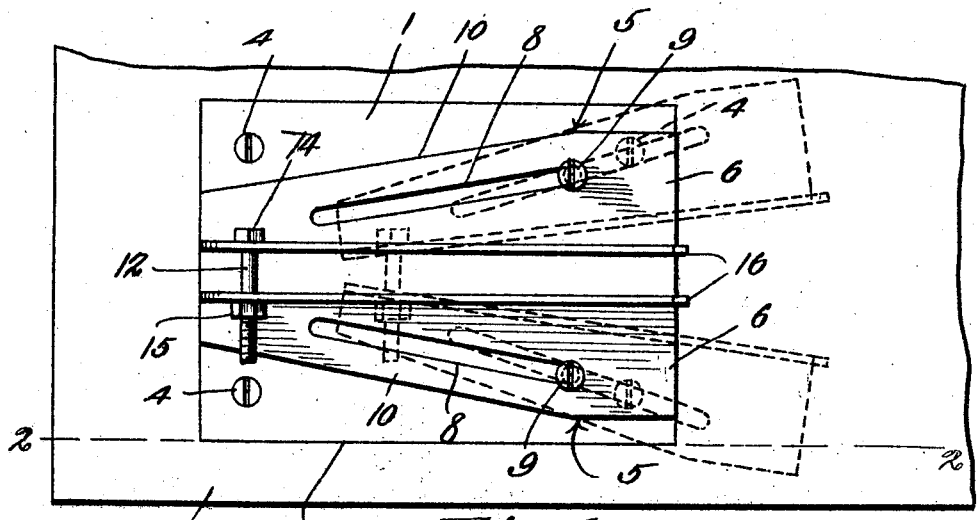
Figure 2:
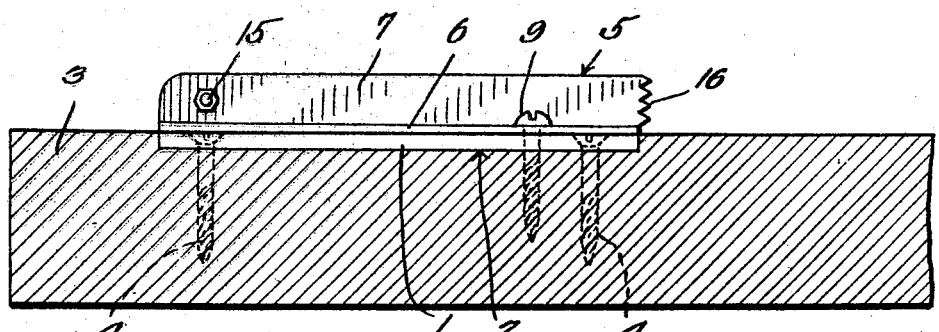
Figure 3:
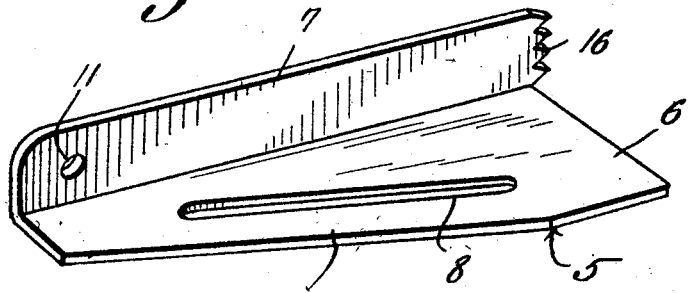

In the accompanying drawings:

Figure 1 shows in top plan, a device constructed in accordance with the invention; Figure 2 is a section on the line 2—2 of Figure 1; Figure 3 is a perspective view showing one of the jaws.

The device forming the subject matter of this application comprises a base 1, in the form of a plate, which, preferably is let into a recess 2 formed in the upper surface of the work bench 3. Screws 4 or other securing elements, passing through the base 1 and entering the work bench 3, hold the base in the recess 2.

The device comprises a pair of jaws denoted generally by the numeral 5, each including a bottom or supporting flange 6 and an upstanding gripping flange 7, the flange 7 being located at the inner edges of the flanges 6. The flanges 6 support the jaws 5 slidably on the base plate 1. The bottom or supporting flanges 6 of the jaws 5 are supplied with guide slots 8 which converge toward the forward ends of the jaws 5. Securing elements 9, such as screws pass through the slots 8, through the base plate 1 and into the work bench 3. The outer edges of the flanges 6 may be inclined as at 10 throughout a portion of the length of the jaws 5, the inclined edges 10 being parallel to the slots 8. Each flange 7 is supplied adjacent to its forward end with an opening 11, the openings 11 being adapted to receive an adjustable connector, preferably in the form of a bolt 12, the head 14 of the bolt engaging one flange 7, and a nut 15 being threaded on the bolt, the nut being adapted to cooperate with the other flange 7. The connector 12 is loosely mounted in the gripping flanges 7, so that, as clearly indicated in Figure 1, relative angular movement may take place between the jaws, when the jaws are retracted on the securing elements 9. Teeth 16 are fashioned on the rear end of the upstanding flanges 7 of the jaws 5.

In practical operation, the nut 15 may be adjusted on the bolt 12, thereby to vary the space between the gripping flanges 7, depending upon the thickness of the work. When the jaws 5 are slid backwardly into the dotted line position of Figure 1, the jaws will be spaced apart at their rear ends, and the end of the work to be operated upon may be inserted between the rear end portions of the upstanding flanges 7. The harder that the work is shoved forwardly, the more tightly will the flanges 7 grip the work, the securing elements 9, cooperating with the slots 8 serving to cause the flanges 7 to hold the work. Should it be desired to use the device as a plain bench stop, the work may be thrust against the teeth 16 of the flanges 7, the jaws 5 sliding forwardly until the securing elements 9 are at the rear ends of the slots 8.

When the occasion for the use of the device has passed, the jaws 5 may be detached from the back plate 1 by removing the screws 9, whereupon the upper surface of the work bench 3 will be smooth and plane, since the base plate 1 is countersunk into the recess 2.

What is claimed is:

In a clamp of the class described, jaws in the form of angle members including supporting flanges and upstanding gripping flanges at the inner edges of the supporting flanges, the supporting flanges having slots which converge toward one end of the clamp, securing devices extended through the slots, and a connector extended through the gripping flanges adjacent to said end of the clamp, the connector being adjustable in length, thereby to space the gripping flanges for work of different thicknesses, the connection being loosely mounted in the gripping flanges to permit relative angular movement between the jaws when the jaws are retracted on the securing elements.

In testimony that I claim the foregoing as my own, I have hereto affixed my signature in the presence of two witnesses.

ZENAS H. WILLIAMS.

Witnesses:
B. C. SASSE,
J. A. KITCHENS.